Jan. 2, 1951　　　　　　　J. K. TANK　　　　　　　2,536,583
　　　　　　　　　　　　FISHING REEL
Filed Jan. 26, 1948　　　　　　　　　　　　2 Sheets-Sheet 1
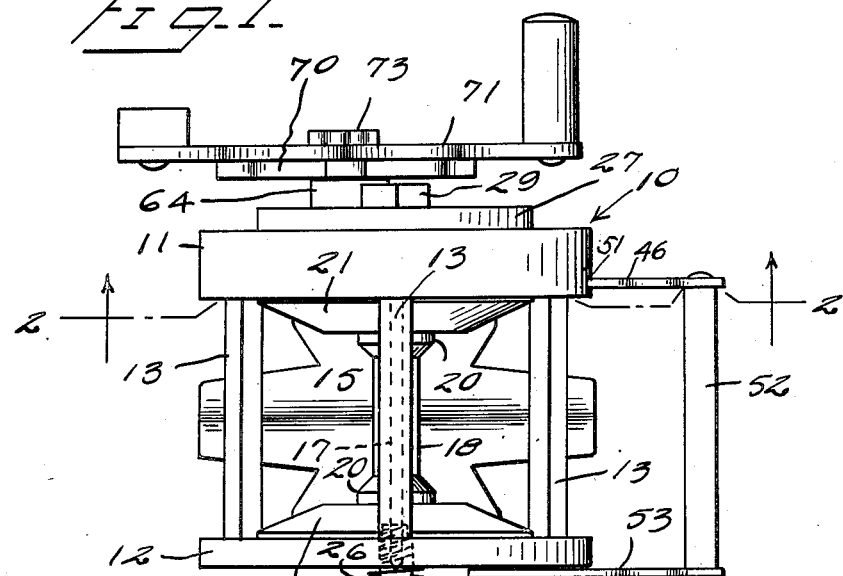
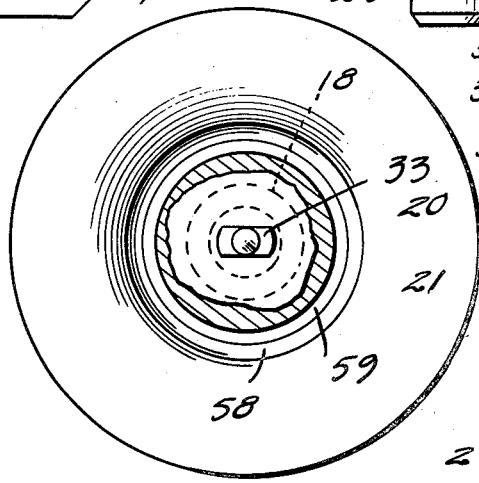
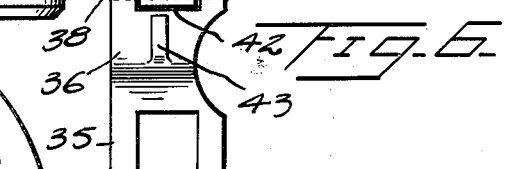
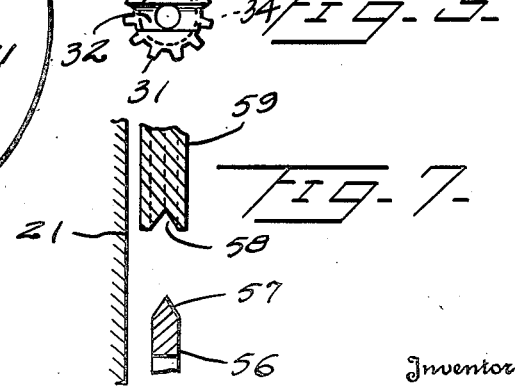
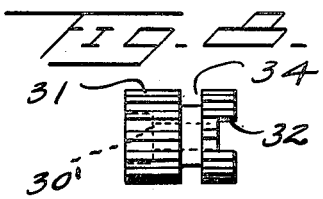
Inventor
John K Tank
By
Kimmel & Crowell Attys.

Jan. 2, 1951  J. K. TANK  2,536,583
FISHING REEL
Filed Jan. 26, 1948  2 Sheets-Sheet 2
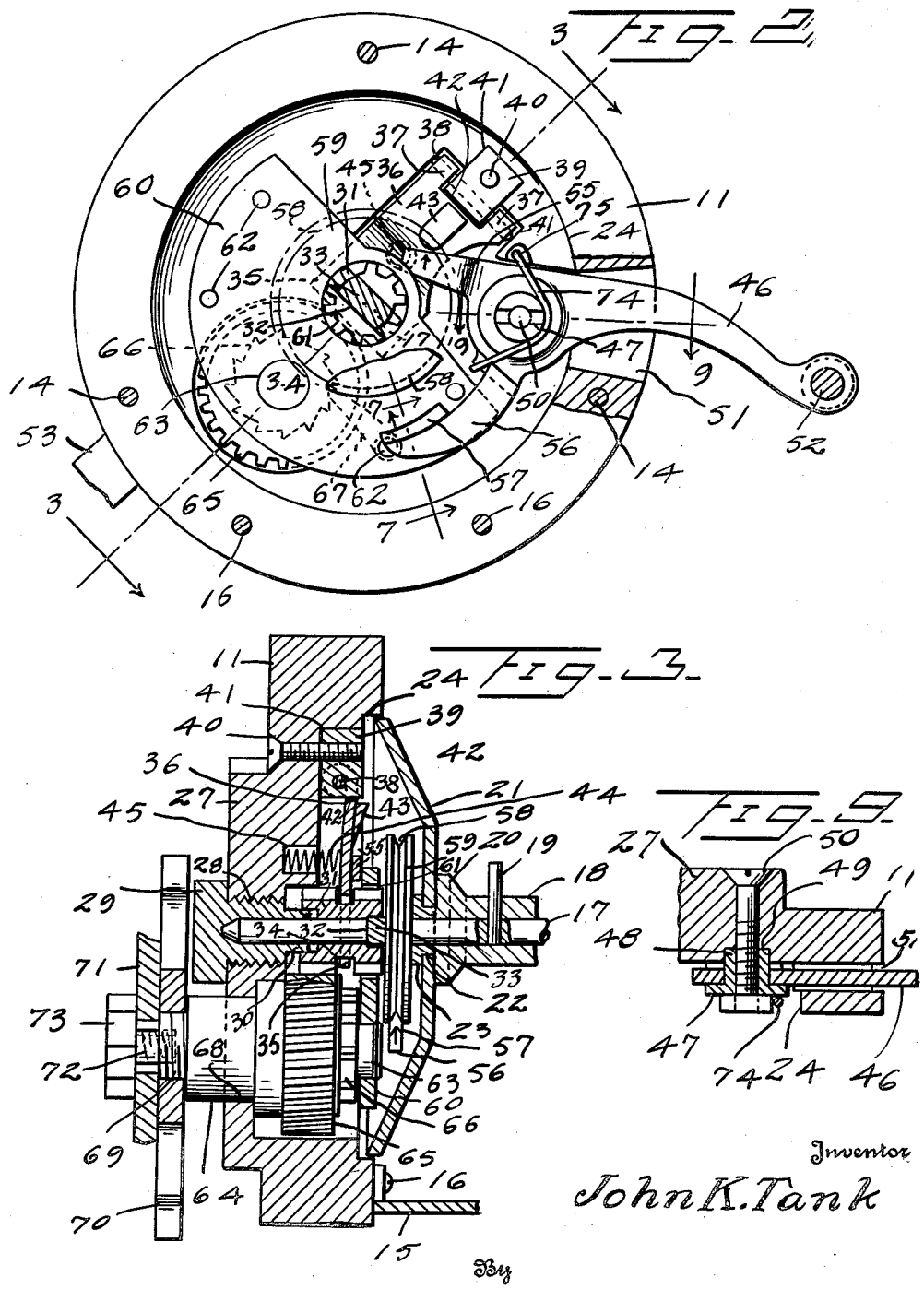
Inventor
John K. Tank
By
Kimmel & Crowell Attys.

Patented Jan. 2, 1951

2,536,583

UNITED STATES PATENT OFFICE 2,536,583

FISHING REEL

John K. Tank, Eureka, Calif.

Application January 26, 1948, Serial No. 4,329

2 Claims. (Cl. 242—84.5)

My invention relates to fishing reels, and more particularly to means for preventing undesired free spinning of the spool and unwinding of the fishing line, or to permit free spinning of the spool and unwinding or paying out of the fishing line as in casting, or when a catch is made and the fish makes a run.

In fishing, when a fish takes the bait and makes a run in an attempt to get away, it is desirable to provide brake means to friction the free spinning of the reel or spool and unwinding of the line therefrom to control the catch and take up the slack when the fish changes its direction or course of run, to avoid fouling or entangling of the line and to maintain the line substantially taut at all times until the catch is made and the fish landed. Reels have been provided with brake means normally engaged and released by the fisherman, applied by the tension on the line to prevent undesired free spinning of the spool and unwinding of the line, but the operation of a brake means by tension of the line engaging a pressure bar at the upper side of the reel housing or frame to apply the brake when the line is taut, or by means of spring-pressed friction discs or the like, has been found inefficient and such devices are not capable of proper control by the fisherman to best facilitate making a catch when a game fish takes the bait and makes a run or reverses the run, thereby tending to foul or entangle the line so as to make it difficult to land the fish.

In most instances the brake means is normally applied by spring pressure and released by the fisherman, but an object of my invention is to provide a brake means for checking or frictioning the free turning or spinning of the spool and unwinding of the line therefrom with the desired friction which may be easily and accurately controlled by the pressure of a thumb or finger of the fisherman on the pressure bar of a brake lever at the lower side of the reel housing or frame, adjacent the point where the reel is mounted on the fishing rod, and to provide finger-touch control whereby the desired braking friction may be applied and the spinning of the spool and unwinding of the line may be stopped at any particular point.

Another object is to provide a reel which has a spool turned by a crank geared to the shaft fixed to the hub of the spool and which includes in the geared drive, a releasable connecting means or clutch between the shaft and pinion thereon to disconnect the crank from the spool at the shaft so that the spool and shaft may run free as when casting to permit free spinning of the reel and unwinding of the line at such time and in certain types of fishing, especially for game fish when the fish takes the bait and makes a run therewith, so that the gears and crank will not turn at such times, or to permit use and application of the brake with the necessary friction on a reel equipped with a star drag and a free spool or otherwise.

Another object is to provide a friction brake means applied by means of a single lever in convenient position on the outside of the reel to apply the desired braking friction to retard the unreeling of the line while obviating the necessity of using a spring, discs or other complicated brake structure to regulate the brake friction or pressure.

A further object is to provide a novel and simple drive means in which a brake means is correlated to a clutch interposed between the gears of the operating connection between the crank and the shaft of the spool rigidly or permanently fixed thereto, so that by slight pressure on a pressure bar of a control lever, the spool may run free as in casting or whenever free spinning is desired, to pay out the line when the fish takes the bait to insure that a fish is caught on a hook before applying a drag on the line, or by applying greater pressure on the pressure bar and lever the brake may be applied simultaneously with the clutch disengaged to put the desired friction or drag on the spool and line in unwinding, and means to check reverse turning of the spool to prevent backlash.

With the above and other objects in view, my invention consists in the arrangement, combination and details of construction disclosed in the drawings and specification, and then more particularly pointed out in the appended claims.

In the drawings,

Figure 1 is a top plan view of a fishing reel constructed in accordance with my invention, Figure 2 is an enlarged sectional elevation taken on the line 2—2 of Figure 1, Figure 3 is a diametrical sectional view taken on the line 3—3 of Figure 2, Figure 4 is an elevation of the spool, partly broken away and in section, to show the means for connecting the spool shaft and hub to the driving gear, Figure 5 is a detail elevation of the driving gear or pinion which associates with the structure shown in Figure 4 to form a releasable clutch, Figure 6 is a detail elevation of a gear shifting plate or detent employed in the structure, Figure 7 is a fragmentary sectional view showing the cooperative relation between the brake lever shoe and the friction wheel with which it cooperates, Figure 8 is an elevation of the gear shown in Figure 5; and Figure 9 is a fragmentary detail sectional view showing the mounting for the brake lever.

Referring to the drawings, the fishing reel is shown as comprising a frame 10, including end housings or plates 11 and 12 placed in spaced parallel relation and connected at spaced intervals in a circular series by cross bars 13 engaged by fastening screws 14 passed through corresponding holes in the end housings or plates 11 and 12 and retaining the latter in fixed relation. At the bottom, the frame of the reel is provided with the usual attaching plate or stirrup 15 secured by fastening means or screws 16 against the inner faces of the end housings or plates 11 and 12 and designed to engage the usual mounting means on the handle end of the fishing rod in the usual or any preferred way.

The end housings or plates 11 and 12 are provided with central openings to receive the ends of a shaft 17 on which the tubular hub 18 of the spool is rigidly attached or fixed as by means of a pin 19. The ends of the hub are flanged, as indicated at 20, to receive the end plates or flanges 21 constituting the heads of the spool and cupped, as more particularly shown in Figure 3 of the drawings. Outwardly of the annular flanges 20, the hub is grooved at 22 to take the heads 21 which are retained in position by the riveted or upset ends 23 of the hub, while the peripheries of the plates or heads 21 extend into circular recesses 24 provided on the inner faces of the end housings or plates 11 and 12. It will be noted that the end housing or plate 11 is somewhat thicker than the end housing or plate 12 and one end of the shaft 17 extends through the central opening in the plate 12, which opening is interiorly threaded to take a cap screw 25 which has a central bore at its inner end, receiving the tapered spindle end of the shaft and the flanged head of which accommodates a coiled spring 26 seating between the end wall of the head and the outer surface of the plate 12, to friction against the tapered end of the shaft or spindle 17 to check the free turning or spinning of the spool.

The purpose of making the plate 11 thicker than the plate 12 is to accommodate the drive connection for operating the spool and for controlling the spinning thereof. This structure is more particularly shown in Figures 2 and 3 of the drawings, from which it will be observed that the outer face of the plate 11 is provided with an eccentrically positioned offset 27, and the hole which receives the adjacent end of the shaft 17 is eccentrically positioned relative to this offset but axially located with respect to the plate 11. The central hole or bore is interiorly threaded as at 28, to take a headed screw 29, the shank of which has a central smooth bore the same as the cap screw 25 to receive the tapered spindle end of the shaft 17 so that a friction drag may be applied to the shaft as previously explained. The inner end of the shank of the screw 29 has a reduced portion 30 over which the counterbored outer end 30' of an elongated tubular gear or pinion 31 fits. This pinion 31 is provided at its inner end with a diametrical groove 32 designed to engage an oppositely flattened key 33 fixed to or formed on the shaft 17, and forming a clutch adapted to be disengaged by sliding the pinion 31 axially on the shaft. The pinion 31 is also provided with an annular groove 34 to take the forked end 35 of a plate 36, having a bifurcated opposite end 37 pivoted by a pin 38 to a mounting block 39 secured by a screw 40 in the recess 41 formed at the inner side of the plate 11 adjacent the circular recess 24. The plate 36 is adapted to swing outwardly on its pivot but is limited in its inward swing by the bight portion 42 between the furcations of the bifurcated end thereof against the adjacent inner side of the block 39. The plate or detent 36 is further provided with a tapered projection 43 pressed in or otherwise formed on the plate 36 near its pivoted end and extending radially of the plate 11 and tapering toward the gear 31 or the axis thereof. A spring 44 is mounted in the counterbored seat 45 at the inner face of the recess 41 to press inwardly on the forked plate or detent 36 and normally hold the pinion 31 in operative connection with the key 33 on the shaft 17.

A lever 46 is pivoted on a sleeve nut 47, the sleeve extension 48 of which is mounted in a counterbore 49 of the plate 11 adjacent the periphery of the recess 24 as by means of a screw 50, and the outer long arm of the lever extends through an elongated radial slot 51 in the peripheral portion of the plate 11 outwardly of the recess 24. The free end of the lever is connected by a pressure bar 52 to the free end of an arm 53 pivoted at 54 on the plate 12, preferably at the outside in axial alignment with the pivot sleeve 48 of the lever 46 so that the pressure bar is at the lower portion and back of the reel when in position for use on the fishing pole. The lever 46 has a forked inner end, including an inwardly offset finger 55 and an inwardly offset arm 56 forming a friction brake shoe or blade, preferably of arcuate form as shown, having an oppositely beveled inner edge 57 and offset inwardly in a radial plane greater than and parallel to the finger 55. The shoe or blade at the beveled edge 57 is adapted to engage in a grooved periphery 58 of a disc 59 fixed to the hub 18 and shaft 17 in the hollowed-out portion of the adjacent end plate or flange 21 adjacent the key 33, so as to permit the application of the necessary friction to retard the turning of the spool or to permit free spinning thereof.

A semi-circular plate 60 is secured against the inner face of the plate 11 at the recess 24 to receive the pinion 31 for axial shifting movement therein at the central opening 61 in the plate. The plate is secured in position as by fastening means or screws 62 and receives one end 63 of a shaft 64 on which a larger spiral gear or pinion 65 is fixed to engage the pinion 31 at its portion outwardly of the annular groove 34. The shaft or hub 64 is also formed with a ratchet wheel 66 engaged by a pawl 67 pivoted adjacent thereto on the inner face of the plate 11 in the recess 24, to prevent reverse turning of the pinion and backlash on the spool and line adapted to be wound on the spool in the usual way. The outer end of the shaft or hub 64 has a reduced portion disposed through an opening 68 in the plate 11, and a further reduced externally threaded portion 69 on which a star wheel 70 of a star drag is threaded. A crank 71 is mounted on a flattened portion 72 of the shaft 64 outwardly of the portion 69, and the end of the shaft is provided with a threaded counterbore in which a headed screw 73 is threaded to hold the crank and star wheel in assembled position. The star wheel may operate as a drag in the customary way. The bearing screws or nuts 25 and 29 for shaft 17 may be adjusted to permit free spinning of the shaft 17 and spool fixed thereto. It may also be mentioned that a V-spring 74 is mounted at one end in a lug 75 on the plate 11 adjacent the lever 46 and is bent around the flange of the screw 47, and the other end of the spring bears against the inner edge of the arm 56 to normally hold the lever 46 in raised position, the finger 55 beyond the tapered inner end of the detent or cam 43 and the arm 56 disengaged from the friction disc 59.

Thus, in the operation and use of the reel, the necessary drag may be applied to the spool by the bearing screws 25 and 29 should this be desired, or said screws may be set at the spindle ends of the shaft 17 to permit free turning or spinning of the shaft and thus the spool. In casting with the spool in free spinning relation, the pressure bar 52 may be left free or held by a finger or thumb of the fisherman while gripping the handle of the fishing pole or rod adjacent the reel so that the spool will spin freely to permit unwinding of the line. When a fish takes the bait and attempts to make a run, the fisherman may friction the unwinding of the line by applying pressure to the bar 52 as explained. Rocking of the lever 46 on its pivot will cause the finger 55 to engage the beveled cam or detent 43 and through the connection of the forked plate 36 with the pinion 31 to shift the latter axially outwardly and disengage it from the key 33 to disconnect the crank from the spool at the shaft 17 and permit turning of the spool free of the drive connection between it and the crank. Depending upon the degree of pressure on the bar 52, the arm 56 will be caused to engage the friction disc 59 and apply the desired braking friction to the spool to retard the rotation of the spool and the unwinding of the line such as after the fish has made its run and has been caught in the hook to insure of a catch. Thus, instead of the friction or braking pressure being normally applied, the spool is normally free spinning and the braking friction is not applied by tension on the line but under accurate and minute control of the fisherman by pressure upon the bar 52 in convenient position while gripping the handle of the fishing pole adjacent the reel. Also, operation is facilitated by the disconnection of the crank simultaneously with the application of the braking friction so that the drive connection between the crank and the shaft and spool does not serve as a drag on the free spinning of the spool when such is desired. Obviously, upon release of the pressure on the bar 52 the spring 44 will immediately come into play to force the plate 36 inwardly on its pivot to move the pinion 31 into locking engagement with the key 33 at the groove 32, thereby forming an effective and simple clutch means interposed in the drive connection between the crank and the spool which is normally operative and may be readily disengaged at the same time that the pressure is applied to friction the turning of the spool and the unwinding of the line.

I do not mean to confine myself to the exact details of construction herein disclosed, but claim all variations falling within the purview of the appended claims.

What I claim is:

1. In a fishing reel having a frame including end housings, and a spool having its shaft journalled in said end housings; drive means for said spool in one of said end housings including a gear slidable on said shaft, interengageable clutch means on said gear and said shaft for rotating said shaft with said gear in one position of the latter, a crank rotatably carried by said one end housing, a geared connection between said crank and said gear, a shifting plate pivotally carried by said one housing and engaging said gear for moving the latter on said shaft, a cam surface formed on said plate, a brake drum formed with a peripheral groove and fixedly mounted on said shaft, and a rockable lever carried by said one housing including a finger member engageable with said cam surface for moving said pivoted plate to clutch disengaging position, a brake shoe supporting arm, and a brake shoe carried by said arm frictionally engaging in said peripheral groove when said lever is rocked to engage the finger member with said cam surface whereby rocking of said lever will disengage the drive means from said shaft and frictionally brake the rotation of the latter.

2. In a fishing reel having a frame including end housings and a spool having the shaft thereof journalled in said end housings; drive means for said shaft including a crank rotatably carried by one of said housings, a gear slidable axially on said shaft, and geared means connecting said crank to said gear, interengageable clutch means on said gear and said shaft for rotating the latter with said gear in one position of said gear, a pivoted plate carried by said one housing and having portions thereof engaging said gear for moving the latter axially relative to said shaft, spring means interposed between said plate and said housing and constantly urging said plate to clutch engaging position, an inclined cam surface formed on said plate, a rockable operating lever carried by said one housing, a handle formed on one end of said lever extending outwardly of said one housing, a finger member formed on the other end of said lever and engageable with said cam surface when said handle is depressed for moving said plate to clutch disengaging position, a peripherally grooved brake drum fixed on said shaft, a brake shoe supporting arm extending from said other end of said lever and spaced from said finger member, a brake shoe carried by said arm and adapted to frictionally engage in the peripheral groove of said drum when said handle is depressed, and spring means connected to said lever constantly urging the latter to handle raised position.

JOHN K. TANK.

REFERENCES CITED

The following references are of record in the file of this patent:

UNITED STATES PATENTS

| Number | Name | Date |
| --- | --- | --- |
| 522,323 | Freese | July 3, 1894 |
| 1,523,983 | Lauterbach | Jan. 20, 1925 |
| 2,001,521 | Cattley | May 14, 1935 |

FOREIGN PATENTS

| Number | Country | Date |
| --- | --- | --- |
| 27,417 of 1902 | Great Britain | Oct. 15, 1903 |